(12) United States Patent
Hannuksela

(10) Patent No.: US 8,520,733 B2
(45) Date of Patent: Aug. 27, 2013

(54) VIDEO CODING

(75) Inventor: Miska Hannuksela, Ruutana (FI)

(73) Assignee: Core Wireless Licensing S.A.R.L, Luxembourg (LU)

( * ) Notice: Subject to any disclaimer, the term of this patent is extended or adjusted under 35 U.S.C. 154(b) by 1940 days.

(21) Appl. No.: 11/479,843

(22) Filed: Jun. 30, 2006

(65) Prior Publication Data

US 2008/0019446 A1    Jan. 24, 2008

(51) Int. Cl.
*H04B 1/66* (2006.01)
*H04N 7/12* (2006.01)

(52) U.S. Cl.
USPC ................. 375/240.16; 375/240.01

(58) Field of Classification Search
USPC .................. 348/416, 400, 43, 401; 382/236; 375/240, 240.01, 240.12, 240.13–240.16, 375/240.24, 240.25, 240.27, 240.29, 240.26
See application file for complete search history.

(56) References Cited

U.S. PATENT DOCUMENTS

| | | | | |
|---|---|---|---|---|
| 2002/0054641 | A1* | 5/2002 | Hannuksela | 375/240.12 |
| 2003/0067637 | A1* | 4/2003 | Hannuksela | 358/504 |
| 2004/0218669 | A1* | 11/2004 | Hannuksela | 375/240.01 |
| 2006/0251177 | A1* | 11/2006 | Webb | 375/240.27 |

OTHER PUBLICATIONS

"Run-Length Encodings", by S.W. Golomb (1966); IEEE Trans. Info. Theory 12(3):399.

* cited by examiner

*Primary Examiner* — Behrooz Senfi
(74) *Attorney, Agent, or Firm* — Perman & Green, LLP

(57) ABSTRACT

A method includes receiving a data signal that includes a plurality of encoded frames in a first access unit, receiving a data message indicative of a similarity between a portion of a first one of the plurality of encoded frames and a portion of a non-successive second one of the plurality of encoded frames in a second access unit, and decoding the portion of the second one of the plurality of encoded frames from the portion of the first one of the plurality of encoded frames when the data signal is corrupted.

22 Claims, 6 Drawing Sheets

VIDEO CODING

TECHNICAL FIELD:

The exemplary embodiments of this invention generally concern video transmission and reception.

BACKGROUND:

There exist numerous video and image coding standards. For example, the JPEG standard is utilized for still images. MPEG2 is directed to digital television while H.261 is used for ISDN video conferencing. H.263 is directed to video coding at low bit rates (typically 20-30 kbps and above). In order to reduce the bandwidth of video data sent in accordance with H.261, H.263, and MPEG-2 Video, a previously coded frame is subtracted from a current frame with only the difference between the two being coded. More specifically, motion estimation is first performed per macroblock, subtraction is performed between the motion compensated macroblock of the previous decoded frame and the current macroblock, and both th emotion vector and the difference macroblock are coded. Areas of the frame that do not change, or that change very little (such as the background) are not encoded but rather only indications which areas have not changed may be coded. Each frame is divided into a discrete plurality of macroblocks. These macroblocks are typically 16×16 pixels in size. As a result, only the macroblocks that experience a change from frame to frame need to be encoded, and indications for the remaining macroblocks that they are not coded may be generated. In this manner, a single frame is encoded in its entirety and a number of subsequent frames are encoded to provide only the changes from previous frames. Periodically, a new frame (an INTRA picture) may be coded in its entirety and the process of coding changes in subsequent frames is repeated. It is not mandatory to code any intra frames other than the first frame of a bitstream.

In video transmission via error prone channels, errors are likely to be found in the received frame, or picture, data. In H.264, a picture is either a frame (of progressive video content) or a field (of interlaced video content). The terms "picture" and "frame" are used interchangeably herein. When a picture is lost or corrupted so severely that the concealment result is not acceptable, the receiver typically pauses video playback and waits for the next INTRA picture to restart decoding and playback. If possible, the receiver also issues a request the transmitter for an INTRA picture update. In some applications, e.g., in multicast video streaming, the transmitter cannot react to INTRA update requests, but rather the transmitter encodes an INTRA picture relatively frequently, such as every few seconds, to enable new clients to join the multicast session and to enable recovery from transmission errors. Consequently, receivers may have to pause video playback for a relatively long time after a lost picture, and users typically find this behavior annoying.

There are numerous ways to decrease the probability of transmission errors that cause the decoder to pause playback. Multiple description coding produces two or more correlated bitstreams so that a high-quality reconstruction can be obtained from all the bitstreams together, while a lower, but still acceptable, quality reconstruction is guaranteed if only one bitstream is received. Video redundancy coding (VRC) is one example of multiple description coding, in which several independent bitstreams are generated by using independent prediction loops. For example, an even frame is predicted from the previous even frame, and an odd frame from the previous odd frame.

Industry standards, such as H.263 and H.264/AVC, specify a mechanism called Supplemental Enhancement Information (SEI), which enables one to include such data in the coded bitstream that is not mandatory for recovery of correct sample values in the decoding process but can be helpful in the rendering process, for example. The SEI mechanism enables one to convey SEI messages in the bitstream. H.263 and H.264/AVC standards contain syntax and semantics for a number of SEI messages. Additionally, it is possible to specify SEI messages in standards that use H.263 or H.264/AVC, and codec vendors can also use proprietary SEI messages. MPEG-2 Video and MPEG-4 Visual standards provide a similar mechanism to SEI known as user data. H.263 and H.264/AVC define the use of spare reference pictures via Supplemental Enhancement Information (SEI) messages for signaling pictures or areas within pictures that can be used to perform motion compensation if the actual reference picture is lost or corrupted. The SEI messages indicate whether a first picture resembles a second picture to an extent that the first picture can be used as an inter prediction reference picture replacing the second picture. Moreover, in H.264/AVC the SEI message allows for indicating that a certain area of a picture in one or more decoded reference pictures resembles the co-located area in a specified decoded picture to such an extent that it may be used to replace the co-located area in the target picture. In H.264/AVC, the spare picture SEI message can reside in various access units, whereas in H.263 the spare reference picture SEI message resides in the picture immediately following the target picture in decoding order. In general, a frame is decoded from an access unit. A field can also be decoded from an access unit. In the scalable extension of H.264/AVC, decoding of an access unit sometimes results in two frames. Each access unit is formed of a series of network abstraction layer units (NAL units) that include one or more coded slices making up a coded picture.

The H.264/AVC coding standard includes a technical feature called a redundant picture. A redundant picture is a redundant coded representation of a picture, called a "primary picture", or a part of a picture. A spare coded picture (i.e. the SEI message) has a different syntax and semantics as the primary coded picture. When decoded, the terms "redundant picture" and "spare picture" can be used interchangeably. Each primary coded picture may have a few redundant pictures. After decoding, the region represented by a redundant picture should be similar in quality as the same region represented by the corresponding primary picture. A redundant picture must reside in the same access unit as the corresponding primary picture. In other words, they are next to each other in decoding order. If a region represented in the primary picture is lost or corrupted due to transmission errors, a correctly received redundant picture containing the same region can be used to reconstruct the region (if all the referenced areas in inter prediction of the redundant picture are correct or approximately correct in content).

The spare reference picture SEI messages in H.263 and H.264/AVC address efficiently only those video sequences that are shot with a stationary camera without zooming or changing the camera direction. However, in picture sequences $P_n$, $P_{n+1}$, $P_{n+2}$, etc. that include camera pan, tilt, zoom-in or zoom-out, a large portion (e.g. non-moving objects and background) of pictures $P_n$ and $P_{n+1}$ resemble each other. If picture $P_{n+1}$ is lost or corrupted, it would help in error concealment and error tracking if the resembling areas could be identified and used in error concealment and as prediction references. As used herein, "error tracking" refers to tracking the impact (spatial coverage and sometimes also estimate of magnitude of error) of erroneously decoded areas in a picture in the next pictures that use the picture as a reference for inter prediction.

Unfortunately, error robustness of redundant pictures suffers from the fact that burst errors easily affect both a primary picture and the corresponding redundant pictures.

BRIEF SUMMARY OF THE INVENTION

The foregoing and other problems are overcome, and other advantages are realized, in accordance with the exemplary embodiments of these teachings.

In accordance with an exemplary embodiment of the invention, a method includes receiving a data signal that includes a plurality of encoded frames in a first access unit, receiving a data message indicative of a similarity between a portion of a first one of the plurality of encoded frames and a portion of a non-successive second one of the plurality of encoded frames in a second access unit, and decoding the portion of the second one of the plurality of encoded frames from the portion of the first one of the plurality of encoded frames when the data signal is corrupted.

In accordance with an exemplary embodiment of the invention, a program of machine-readable instructions, tangibly embodied on an information bearing medium and executable by a digital data processor, performs actions including receiving a data signal comprising a plurality of encoded frames in a first access unit, receiving a data message indicative of a similarity between a portion of a first one of the plurality of encoded frames and a portion of a non-successive second one of the plurality of encoded frames in a second access unit, and decoding the portion of the second one of the plurality of encoded frames from the portion of the first one of the plurality of encoded frames when the data signal is corrupted.

In accordance with an exemplary embodiment of the invention, a method includes encoding a plurality of frames to form a data signal, computing a data message indicative of a similarity between a portion of a first one of the plurality of frames and a portion of a non-successive second one of the plurality of frames, and separately transmitting the data signal and the data message.

In accordance with an exemplary embodiment of the invention, a program of machine-readable instructions, tangibly embodied on an information bearing medium and executable by a digital data processor, performs actions including encoding a plurality of frames to form a data signal, computing a data message indicative of a similarity between a portion of a first one of the plurality of frames and a portion of a non-successive second one of the plurality of frames, and separately transmitting the data signal and the data message.

In accordance with an exemplary embodiment of the invention, a mobile device includes an element for receiving a data signal comprising a plurality of encoded frames in a first access unit, an element for receiving a data message indicative of a similarity between a portion of a first one of the plurality of encoded frames and a portion of a non-successive second one of the plurality of encoded frames in a second access unit, and an element for decoding the portion of the second one of the plurality of encoded frames from the portion of the first one of the plurality of encoded frames when the data signal is corrupted.

In accordance with an exemplary embodiment of the invention, a mobile device includes a wireless transceiver, a processor coupled to the wireless transceiver, and a memory coupled to the processor for storing a set of instructions, executable by the processor, for receiving a data signal comprising a plurality of encoded frames, receiving a data message indicative of a similarity between a portion of a first one of the plurality of encoded frames and a portion of a non-successive second one of the plurality of encoded frames, and decoding the portion of the second one of the plurality of encoded frames from the portion of the first one of the plurality of encoded frames when a frame preceding the second one of the plurality of encoded frames is corrupted.

BRIEF DESCRIPTION OF THE DRAWINGS

The foregoing and other aspects of these teachings are made more evident in the following Detailed Description of the Invention, when read in conjunction with the attached Drawing Figures, wherein.

DETAILED DESCRIPTION OF THE INVENTION

Spare pictures as in H.264/AVC can signal that an area in one picture resembles a co-located area in another picture. Redundant picture in H.264/AVC is another coded representation of an entire or a part of a primary coded picture, both appearing in the same access unit, and redundant coded picture having the same syntax, semantics, and decoding process as primary coded picture.

In accordance with exemplary and non-limiting embodiments of the invention, a spare picture is another coded representation of an entire or a part of a primary coded picture that 1) may not appear in the same access unit as the primary coded picture, and 2) may not have the same syntax, semantics and/or decoding process as the primary coded picture. A spare picture according to exemplary embodiments of the invention is not limited to a copy of sample values from co-located areas as the spare picture of H.264/AVC is. As discussed below in reference to exemplary embodiments of the invention, a decoded spare picture may be derived from the SEI message, whereas the spare pictures of H.264/AVC are indicated from existing reference pictures.

In exemplary embodiments of the invention, there is provided a method for mitigating the effect of error propagation in video decoding when the decoded bitstream may be corrupted by transmission errors, particularly that which is introduced by employing predictive coding. Specifically, in the exemplary embodiments disclosed below, there is introduced the transmission, reception, coding, and decoding of spare picture information via messages, such as SEI messages, that allow for the signaling of redundant pictures or sub-pictures on any access unit at or subsequent to the corresponding primary picture in decoding or bitstream order. As used herein, a "spare picture" refers to a picture, or a portion of a picture, that is substantially similar to another picture, or picture portion. When a spare picture (or part of a spare picture) sufficiently resembles another picture, such as an actual motion compensation reference picture (or part of the reference picture), the spare picture can be used as a reference instead of the actual picture when the actual picture is lost or corrupted. The spare picture can also be used by the rendering process instead of the actual reference picture. The actual reference picture is referred to herein as a target picture for convenience.

Stated simply, the quality degradation caused by decoding the alternative reference picture operating as a spare picture is sufficiently small such that the quality of the decoded picture is considered to be acceptable. There is therefore disclosed a method for signaling spare pictures and portions of spare pictures that are entirely or partly similar to pictures requiring decoding.

Figure 1:
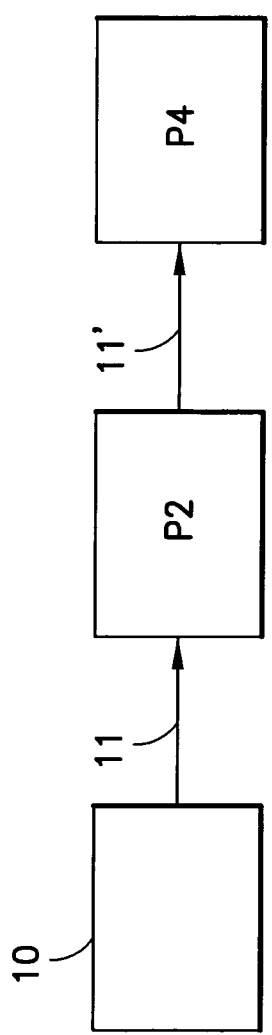
FIG. 1 is a diagram showing a method of decoding picture data known in the art.

With reference to FIG. 1, there is illustrated a method known in the art to decode a picture. A target picture 10 is illustrated as well as two subsequent frames P2, P4. Target picture 10 is received containing all of the information required to decode target picture 10 without reliance on a previously received frame. Frame P2 is formed from a access unit 11 that encodes the differences between target picture 10 and frame P2. Using the access unit 11 and the target picture 10, frame P2 is decoded. In a similar fashion, access unit 11' encodes the differences between frame P2 and frame P4. Using the access unit 11' and decoded frame P2, frame P4 is decoded. As is evident, this process is suited to instances wherein the transmission and reception of the target picture 10 and the access units 11, 11' occur without the introduction of error, such as might result from the loss or corruption of one or more data packets.

Figure 2:
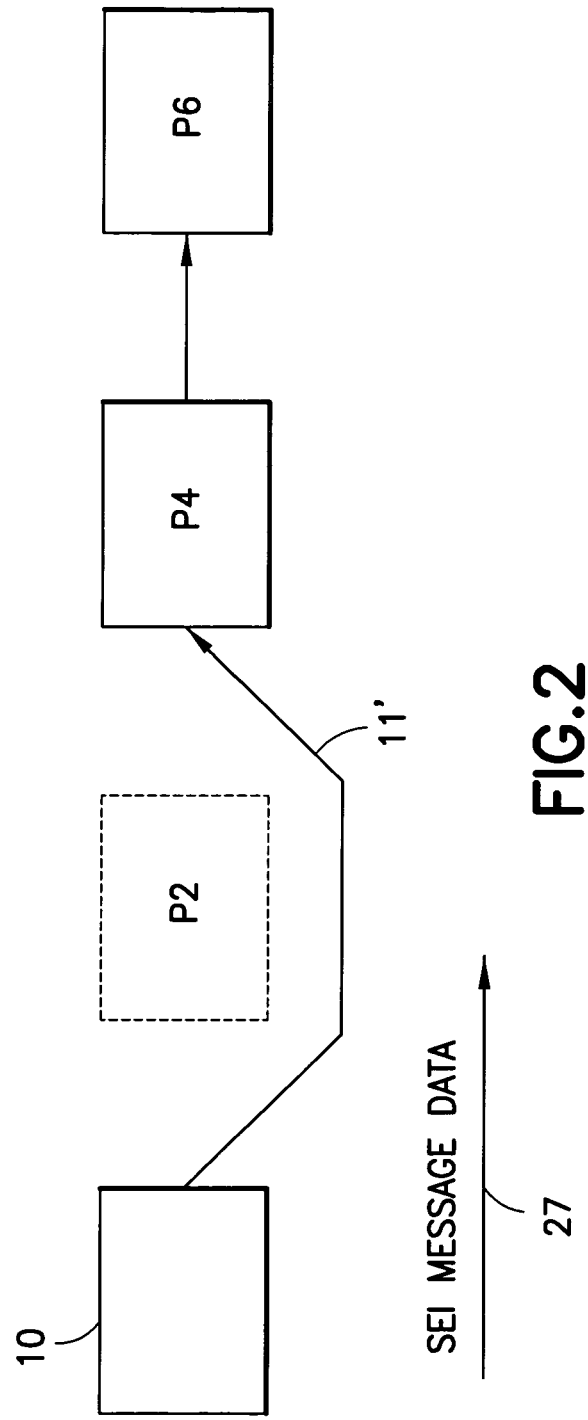
FIG. 2 is a diagram showing an exemplary embodiment of the use of spare pictures according to the exemplary embodiments of this invention.

With reference to FIG. 2, there is illustrated an exemplary embodiment of the method of the invention. As before, target picture 10 is received containing all of the information necessary to decode target picture 10 without reliance on a previously received frame. Target picture 10 is not a spare picture as such, but is rather a picture derived from the decoded target picture, for example, by motion compensation in a spare picture. However, as illustrated, an error in the reception of access unit 11 prevents the decoding of frame P2. Access unit 11' is received without error. As previously noted, access unit 11' encodes the differences between frame P2 and frame P4. As P2 cannot be decoded in this example, it is not possible to apply the information contained in access unit 11' to frame P2. However, as illustrated, target picture 10 is a spare picture of frame P2. Specifically, the differences between the target picture 10 and frame P2 are sufficiently small such that access unit 11' can be applied to target picture 10 to decode frame P4 within acceptable error parameters. The details of how a decoder ascertains that the target picture 10 is a spare picture for frame P2 is described more fully below.

Figure 3:
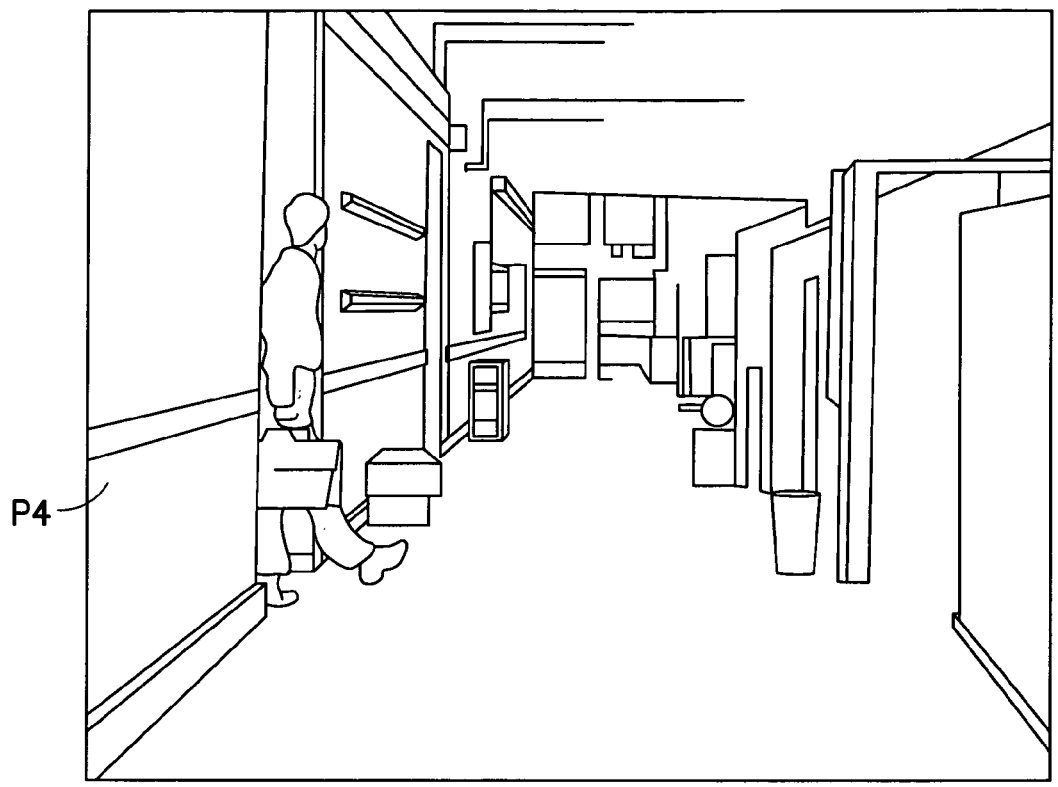
FIG. 3 is an illustration of a frame decoded according to the method illustrated in FIG. 1.
Figure 4:
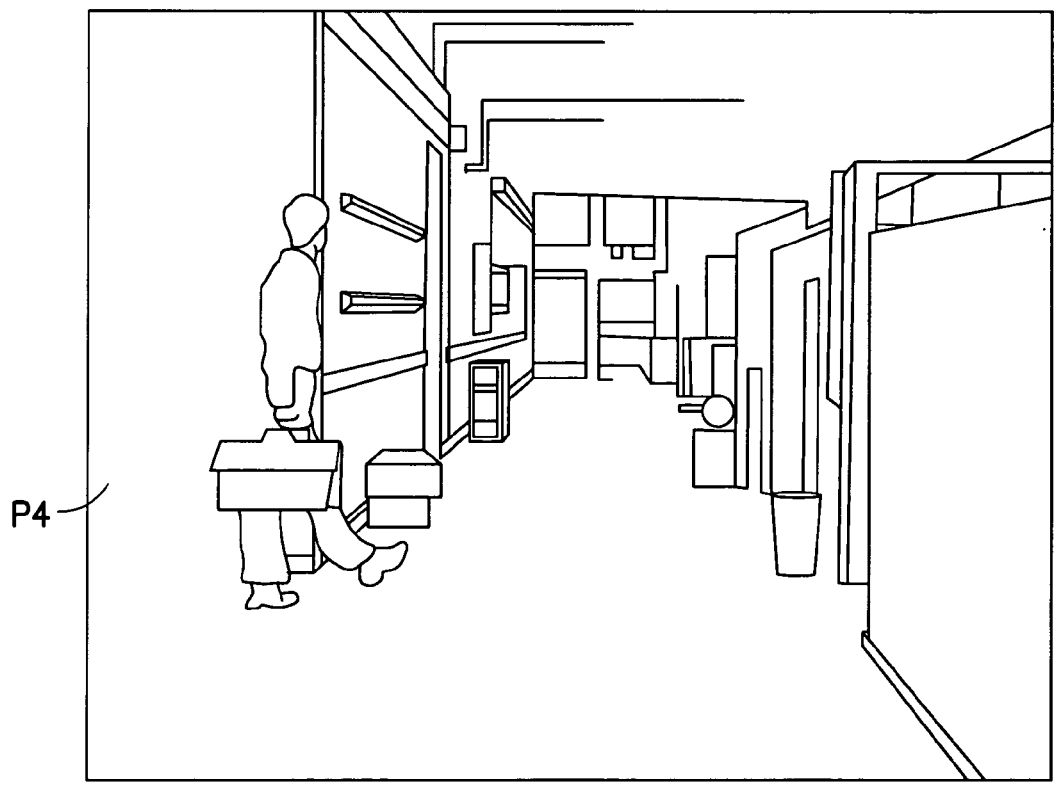
FIG. 4 is an illustration of a frame decoded according to the exemplary method of the invention illustrated in FIG. 2.

With reference to FIGS. 3 and 4, there are illustrated the results of applying the decoding methodology described with reference to FIGS. 1 and 2, respectively. FIG. 3 shows frame P4 decoded from frame P2 using access unit 11'. FIG. 4 shows frame P4 decoded from the target picture 10 using access unit 11'. As illustrated, the content of frame P4 in FIG. 4 is substantially similar to that illustrated in FIG. 3 with the exception that, in FIG. 4, the camera used to capture frame P4 is assumed to have experienced a panning motion. This substantial similarity allows the target picture 10 to be designated a spare picture for frame P2. The details of how a target picture 10 or frame is determined to be a spare picture for another picture or frame is described more fully below.

Figure 5:
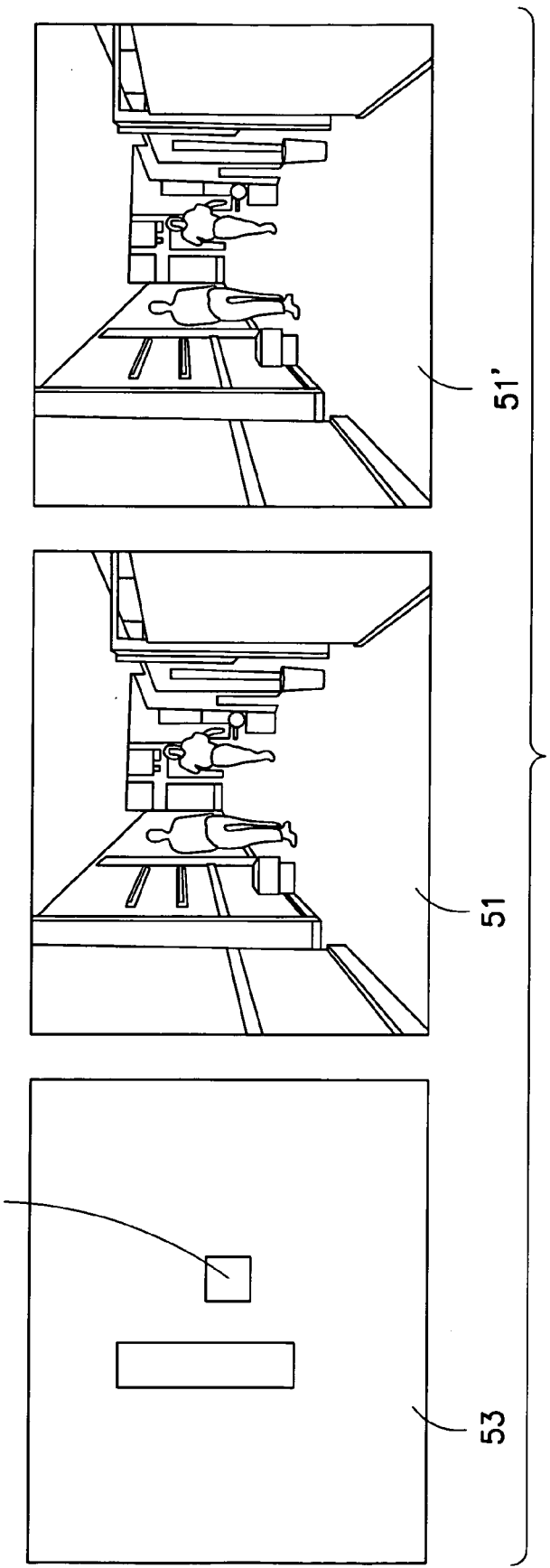
FIG. 5 is an illustration of a spare macroblock map according to another exemplary embodiment of the invention.

In the exemplary embodiment of the invention described with reference to FIG. 2, target picture 10 can be designated a spare picture for frame P2. However, in another exemplary embodiment of the invention, a portion of a picture or frame can also serve as a spare picture for another picture or frame. With reference to FIG. 5, there are illustrated two similar frames 51, 51'. The differences which exist between the two frames 51, 51' are generally small over a relatively large area of both frames 51, 51' with only small areas representing portions of relatively high dissimilarity.

Spare macroclock map 53 is a bi-level map used to represent spare macroblock information. As used herein, a "spare macroblock" is a portion of a picture or frame, formed of individual macroblocks 55, that can be used as a spare picture for another picture or frame. Specifically, spare macroblock map 53 functions as a spare macroblock map between frames 51 and 51'. In spare macroblock map 53, similar areas which can be used as spare macroblocks 55 are shown in black. Conversely, dissimilar areas which cannot be used as spare macroblocks 55 are shown in white. For purposes of discussion, in an exemplary embodiment a spare macroblock 55 shown in black corresponds to a bit value of "0" while a white spare macroblock 55 corresponds to a bit value of "1". Spare macroblock map 53 indicates to the decoder which parts of frame 51 can be used to replace corresponding parts of frame 51' in case the latter is a reference frame that is lost or corrupted.

In an exemplary embodiment of the invention, there is signaled both entire and partial spare pictures such as through the use of, for example, the Supplemental Enhancement Information (SEI) mechanism in H.264/AVC. While described herein with reference to SEI messages, the use of the exemplary embodiments of this invention is not so limited. Rather the exemplary embodiments of this invention are broadly drawn to encompass any and all signaling schemes by which entire and partial spare pictures can be signaled. Utilizing one or more spare picture SEI messages 27, when an actual reference block, picture, or frame is lost or corrupted, a decoder can make use of an entire spare picture or partial spare pictures.

With continued reference to FIG. 2, there is illustrated a spare picture SEI message 27 transmitted separately from frames 10,P2,P4,P6 and access unit 11'. Typically, the spare picture SEI message 27 contains the resemblance between a certain target picture 10 and one or more other pictures or frames P2,P4,P6. When delivered over a packet network (not shown), the spare picture SEI message 27 is not packetized together with the target picture 10 or access unit 11' in order to avoid the spare picture SEI message 27 being lost or corrupted together with the target picture 10. In other words, in exemplary embodiments of the invention, utility is derived from transmitting spare picture SEI messages 27 independently or together with the slices or data partitions belonging to pictures or frames other than the target picture 10. As noted above, existing methods encode SEI messages 27 in access units containing either the target picture or successive redundant pictures.

Indicating that an entire picture or frame can serve as a spare picture for another picture or frame is straightforward. For example, a single bit can be set in a spare picture SEI message 27 to indicate that a defined spare picture can be used in its entirety to decode a given frame. Conversely, the same bit can be used to indicate if only a portion of a spare picture can be used to decode a given frame.

In one exemplary embodiment of the invention, a Supplemental Enhancement Information (SEI) message is defined for use as follows:

| spare_pic( payloadSize ) {                                    | C | Descriptor |
|---------------------------------------------------------------|---|------------|
| target_frame_num                                              | 5 | ue(v)      |
| spare_field_flag                                              | 5 | u(1)       |
| if( spare_field_flag )                                        |   |            |
|   target_bottom_field_flag                          | 5 | u(1)       |
| num_spare_pics_minus1                                         | 5 | ue(v)      |
| for( i = 0; i < num_spare_pics_minus1 + 1; i++ ) {            |   |            |
|   delta_spare_frame_num[ i ]                        | 5 | ue(v)      |
|   if( spare_field_flag )                            |   |            |
|     spare_bottom_field_flag[ i ]          | 5 | u(1)       |
|   mvx                                               | 5 | se(v)      |
|   mvy                                               | 5 | se(v)      |
|   spare_area_idc[ i ]                               | 5 | ue(v)      |
|   if( spare_area_idc[ i ] == 1 )                    |   |            |
|     for( j = 0; j < PicSizeInMapUnits; j++ ) |   |         |
|       spare_unit_flag[ i ][ j ] | 5 | u(1)       |
|   else if( spare_area_idc[ i ] == 2 ) {             |   |            |
|     mapUnitCnt = 0                        |   |            |
|     for( j=0; mapUnitCnt < PicSizeInMapUnits; j++ ) { | | |
|       zero_run_length[ i ][ j ] | 5 | ue(v)      |
|       mapUnitCnt += zero_run_length[ i ][ j ] + 1 | | |
|     }                                     |   |            |
|   }                                                 |   |            |
| }                                                             |   |            |
| }                                                             |   |            |

This SEI message indicates that certain sample values or interpolated sample values, called spare samples, in one or more decoded reference pictures resemble the sample values in indicated slice group map units in a specified decoded picture called the target picture. A spare sample value may be used to replace a corresponding sample value in the target picture. A decoded picture containing spare sample values is called a spare picture. Descriptions of the SEI massage fields according to exemplary and non-limiting embodiments of the invention differ from the semantics of the spare picture SEI message of H.264/AVC in the following fields:

mvx indicates the horizontal displacement of the spare samples compared to the corresponding samples in the target picture.

mvy indicates the vertical displacement of the spare samples compared to the corresponding samples in the target picture.

mvx and mvy are indicated in units of a quarter of a sample for luma samples and a half of a sample for chroma samples. If mvx or mvy refer to a sub-sample position, the fractional sample interpolation process of H.264/AVC is used to derive the spare sample values.

spare_area_idc[i] indicates the method used to identify the spare slice group map units in the i-th spare picture. spare_area_idc[i] shall be in the range of 0 to 2, inclusive. spare_area_idc[i] equal to 0 indicates that spare samples are derived from i-th spare picture to all samples in the target picture. spare_area_idc[i] equal to 1 indicates that the value of the syntax element spare_unit_flag[i][j] is used to identify the slice group map units for which spare samples are derived. spare_area_idc[i] equal to 2 indicates that the zero_run_length[i][j] syntax element is used to derive the values of spareUnitFlagInBoxoutorder[i][j], as described below.

spare_unit_flag[i][j] equal to 0 indicates that spare samples in the i-th spare picture are derived for the j-th slice group map unit in raster scan order in the target picture. spare_unit_flag[i][j] equal to 1 indicates that spare samples in the i-th spare picture are not derived for j-th slice group map unit in raster scan order.

zero_run_length[i][j] is used to derive the values of spareUnitFlagInBoxoutorder[i][j] when spare_area_idc[i] is equal to 2. In this case, the slice group map units identified for each spare picture in spareUnitFlagInBoxOutOrder[i][j] appear in counter-clockwise box-out order, as specified in subclause 8.2.2.4 of H.264/AVC standard. spareUnitFlagInBoxOutorder[i][j] equal to 0 indicates that spare samples in the i-th spare picture are derived for the j-th slice group map unit in counter-clockwise box-out order in the target picture. spareUnitFlagInBoxoutorder[i][j] equal to 1 indicates that spare samples in the i-th spare picture are not derived for the j-th slice group map unit in counter-clockwise box-out order in the target picture. Formulas (D-4) and (D-5) of H.264/AVC standard are used to derive spareUnitFlagInBoxOutOrder[i][j] identically to H.264/AVC standard.

In an exemplary embodiment of the invention, a Supplemental Enhancement Information (SEI) message is defined for use as follows:

| redundant_picture( payloadSize ) {                | C | Descriptor |
|---------------------------------------------------|---|------------|
| num_nal_units                                     | 5 | ue(v)      |
| for( i = 0; i < num_nal_units; i++ ) {            |   |            |
|   num_bytes_in_nal_unit                 | 5 | ue(v)      |
|   num_padding_bits                      | 5 | u(3)       |
|   for( j = 0; j < num_padding_bits; j++ ) |  |          |
|     padding_bit               | 5 | u(1)       |
|   nal_unit(num_bytes_in_nal_unit)       |   |            |
| }                                                 |   |            |
| }                                                 |   |            |

This SEI message indicates that the network abstraction layers (NAL) units contained in this SEI message may be decoded to replace the corresponding decoded picture area in the reference picture having equal values of frame_num, field_pic_flag (if present) and bottom_field_flag (if present) as included in the NAL units of this SEI message. Descriptions of the SEI massage fields are as follows:

num_nal_units indicates the number of NAL units in the redundant picture.

num_bytes_in_nal_unit indicates the number of bytes in the following NAL unit.

num_padding_bits indicates the number of padding bits to align the start of the following NAL unit on a byte boundary.

padding_bit equals to 1.

A redundant coded picture according to the H.264/AVC standard is decoded with the decoder state (in particular the contents of the decoded picture buffer and the marking of reference pictures) that is identical to the state just before decoding the corresponding primary coded picture. In exemplary embodiments of the invention, the spare picture defined by the redundant picture SEI message 27 is decoded with the decoder state just before decoding the primary coded picture of the access unit in which the redundant picture SEI message 27 appears. The syntax and semantics of the NAL units encapsulated in the redundant picture SEI message 27 is identical to the NAL units specified in H.264/AVC standard. Only slice and slice data partition NAL units are allowed in the redundant picture SEI message. The decoding process of the NAL units in the redundant picture SEI message is identical to the decoding process of the primary coded picture except for when it comes to decoded reference picture marking. Instead of marking a decoded spare picture as "used for reference" (and inserting it into the decoded picture buffer), the sample values of the decoded spare picture may be used to replace the sample values of the target picture. The target picture is identified by the frame_num syntax element and the bottom_field syntax element, if present.

If only parts of a picture or frame sufficiently resemble the target picture 10, a bi-level spare macroblock map 53 of such areas, as described above, is computed and signaled. In order to code more than one spare macroblock map 53, it is noted that the neighboring spare macroblock maps resemble each other. For example, moving from the target picture 10, to frame P2, to frame P4, and to frame P6 it is likely that each successive frame is more and more different from the target picture 10. For example, it is possible, as described above, that target picture 10 can serve as a spare picture for frame P2 while not being similar enough to frame P4 to serve as a spare picture for frame P4. As a result, it is likely that portions of, for example, target picture 10 that are not suitable to serve as spare macroblocks for frame P4 are also not suitable to serve as spare macroblocks for frame P6. As a result, given a series of partial spare pictures or frames, successive spare macroblock maps 53 each correlating to a single partial spare picture are related. Specifically, a successive spare macroblock map 53 is likely to preserve the unusable areas encoded in the previous spare macroblock map 53 while adding more unusable macroblocks.

Therefore, in exemplary embodiments of the invention, a first spare macroblock map 53 is encoded between the target picture 10 and the first spare picture. To encode subsequent spare macroblock maps 53, the most recently computed spare macroblock map 53 is first processed by applying a logical operator, such as an exclusive OR (XOR) operation, on the previous spare macroblock map 53. Using the exemplary bit scheme described above, the resulting spare macroblock map 53 appears white only where there is a difference between the most recently computed spare macroblock 53 and the previous spare macroblock 53.

In an exemplary embodiment of the invention, successively computed and encoded spare macroblock maps 53 are arranged into a one-dimensional signal so that the number of consecutive spare macroblocks can be encoded, for example, using exponential-Golomb codes. The use of exponential-Golomb codes is well known and is described, for example, in "Run-length Encodings" by S. W. Golomb (1966); IEEE Trans Info Theory 12(3):399. The conversion of the two dimensional spare macroblocks 53 into a one-dimensional signal dictates a uniform scan order for each individual spare macroblock map 53. In one exemplary embodiment, a counter-clockwise box-out scan order is employed.

There has therefore been described a method by which a target picture 10 and at least one subsequent frame can be processed to determine which pictures and frames can serve as spare pictures, or partial spare pictures, for other pictures and frames. In addition to transmitting and receiving a signal used to decode a target picture 10 and subsequent frames, spare picture information can be transmitted and received, such as through the use of one or more SEI messages. In the event that one or more of the spare pictures defined in a SEI message is a partial spare picture, one or more spare macroblock maps 53 is included in the SEI message to indicate the portions of the spare picture that are suitable for decoding purposes.

Figure 7:
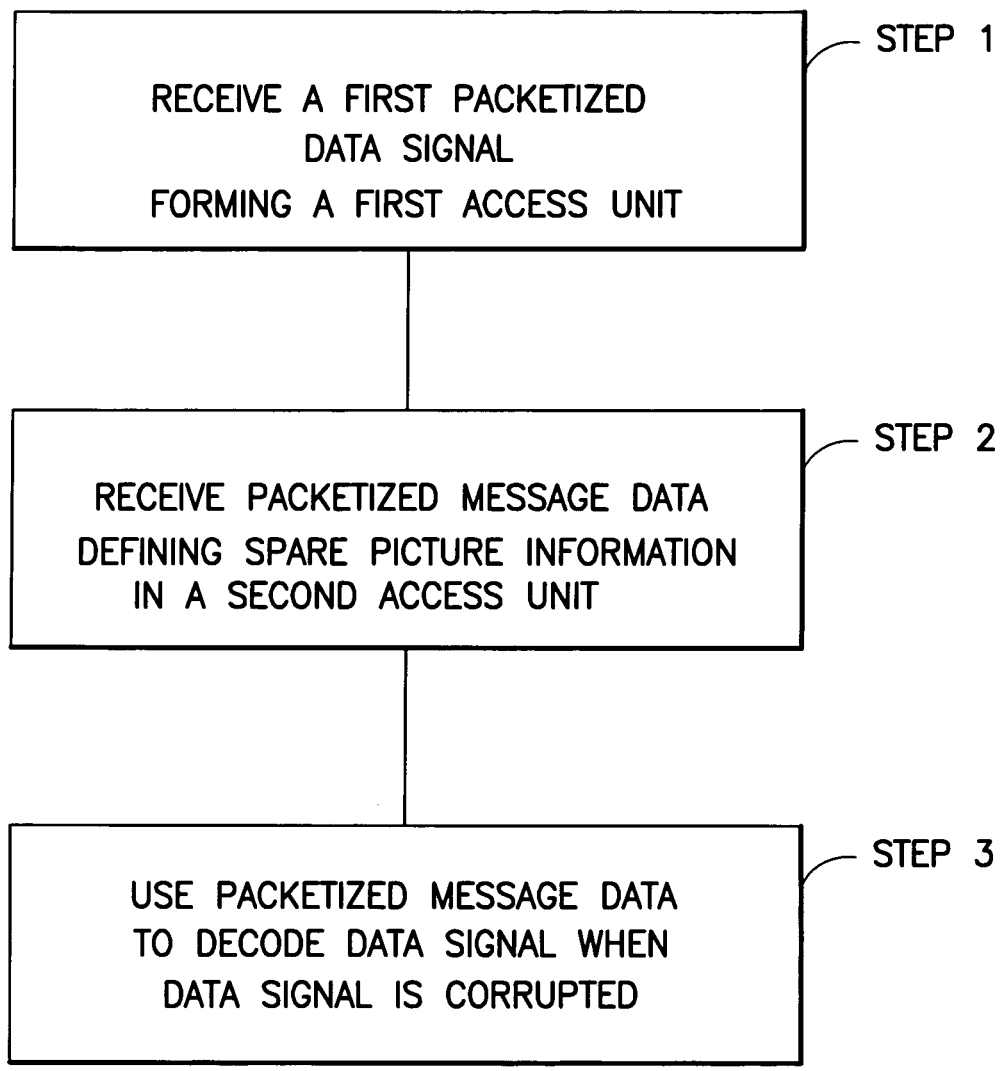
FIG. 7 is a diagram of another exemplary embodiment of a method of the invention.

With reference to FIG. 7, there is illustrated a diagram of an exemplary embodiment of a method of the invention. At step 1, a first packetized data signal is received. The packetized data signal consists of at least one access unit defining a plurality of frames and the bitstreams required to decode each successive frame. At step 2, there is received packetized message data, such as in the form of a SEI message, consisting of spare picture information for at least one of the frames in the packetized data signal. At step 3, the packetized message data is decoded into individual frames using the packetized message data in the event that an error in the paketized message data is discovered.

Figure 8:
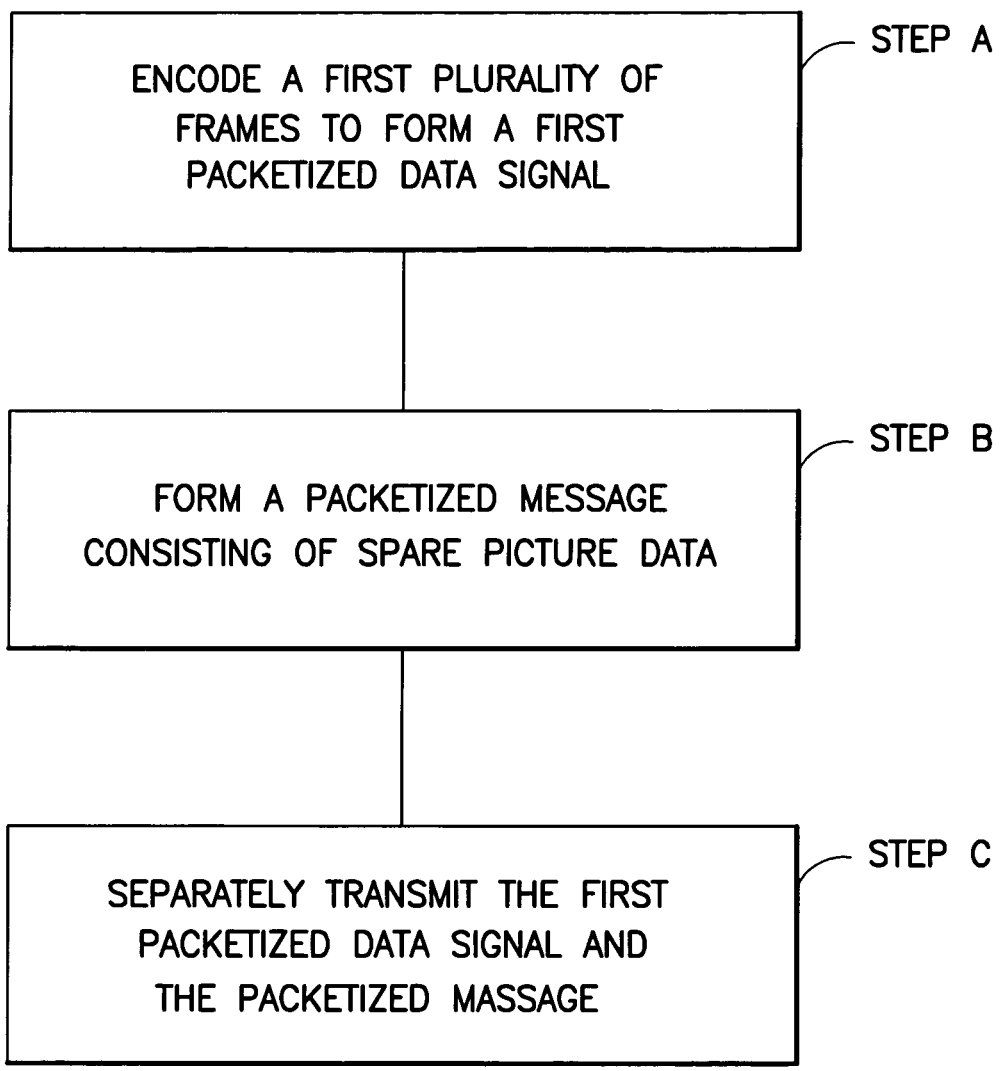
FIG. 8 is a diagram of another exemplary embodiment of a method of the invention.

With reference to FIG. 8, there is illustrated a diagram of another exemplary embodiment of a method of the invention. At step A, a plurality of frames are encoded as described above to form a packetized data signal. At step B, spare picture data associated with at least one encoded frame of step A is utilized to create a data signal in the form of a packetized message, such as an SEI message. At step C, the packetized data signal and packetized message are separately transmitted for later use together in the event that the received packetized data signal is corrupted. By "separately transmitted" it is meant that both the packetized data signal and the packetized data message are transmitted in a manner such that the reception of packet data contained in one does not depend on the reception of packet data contained in the other. Stated another way, they are transmitted in such a manner that an event that would impair one packet would likely not impair the other. In exemplary embodiments of the invention, the packetized data signal and the packetized data message are transmitted in a separated manner, as non-limiting examples, by time, frequency, and/or communication pathway.

There is now described exemplary embodiments of the invention whereby a spare macroblock map 53 is created. To determine whether a candidate macroblock can be a spare macroblock of the current macroblock in a target picture or frame during encoding, the average pixel difference in luminance may be used as the criterion to evaluate the similarity between the target macroblock and the candidate macroblock. Note that the candidate marcroblock can be at any spatial location in the spare picture and a motion estimation process is used to search for the best candidate macroblocks. In order to find a uniform motion field across several macroblocks, any global motion estimation algorithm may be used. If the average pixel difference across the macroblock is less than a certain threshold, it is determined that the candidate macroblock can be a spare macroblock. In the exemplary embodiment described above, the spare macroblock is coded with a bit value of "0". In an exemplary and non-limiting embodiment of the invention where the luminence ranges from 0-255, an empirical average pixel difference threshold is 6.

In an exemplary embodiment of the invention, in order to reduce the overhead in signaling spare picture information, the encoder assumes that the entire picture can serve as a spare picture if the number of the macroblocks in a candidate picture that can be used as spare macroblock is sufficient to produce decoded frames with acceptable amounts of error. An exemplary and non-limiting percentage threshold may be one greater than about 90%, for example about 92%. During decoding, if the spare picture information is received for a picture that is a reference picture and is partly or entirely lost during transmission, the lost parts of the picture can be replaced with correctly reconstructed reference spare macroblocks or picture, if available.

Figure 6:
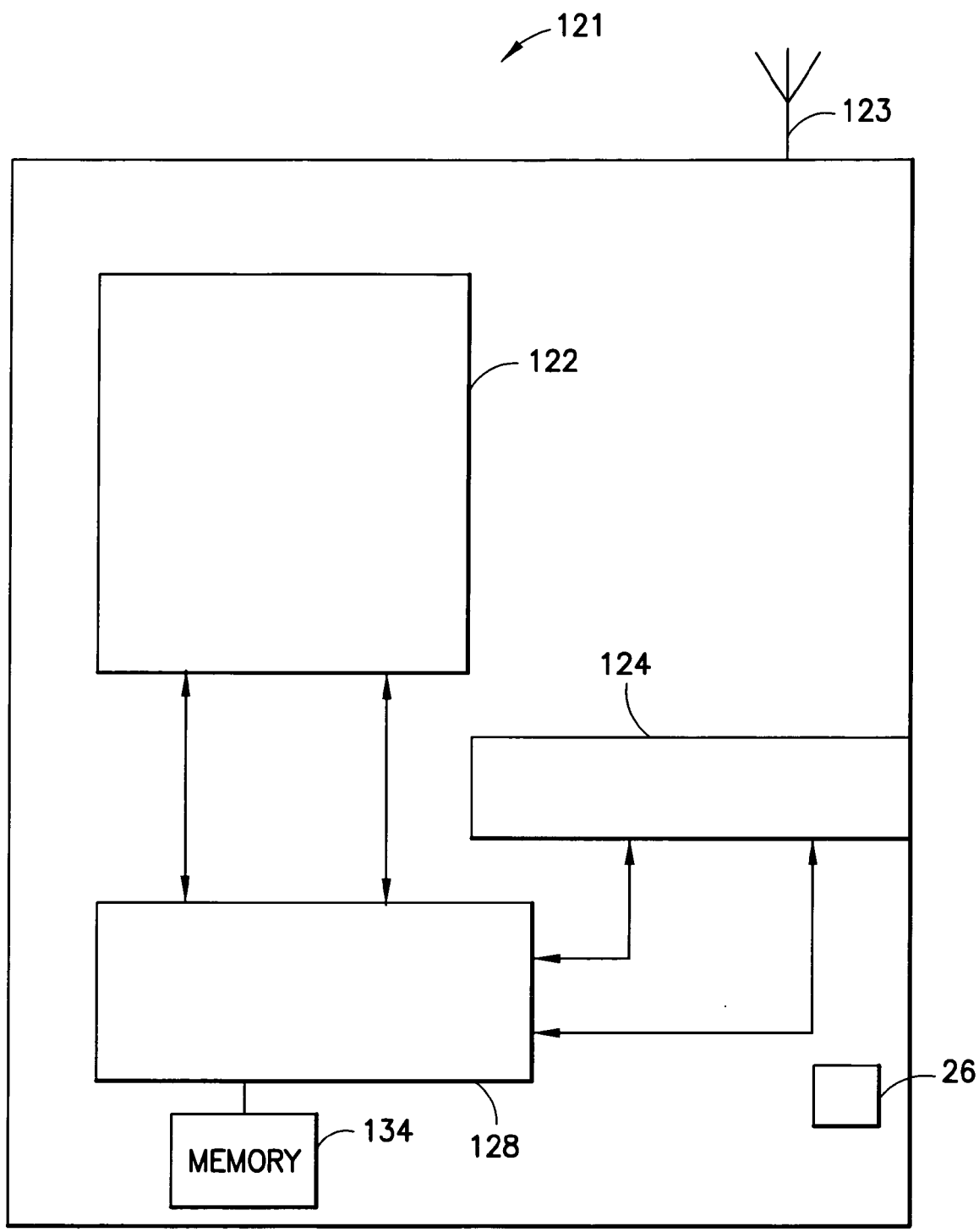
FIG. 6 is a diagram of an exemplary embodiment of an apparatus for practicing the invention.

With reference to FIG. 6, there is illustrated a in block diagram form a computing device 121 for performing the above described exemplary embodiments of the invention. These blocks are functional and the functions described below may or may not be performed by a single physical entity as described with reference to FIG. 6. Computing device 121 can include a wireless transceiver 123 for receiving packetized picture data as well as SEI message data. A display 122 is provided for displaying decoded pictures and frames. An input user interface 124 may be provided for interfacing with a user. The computing device 121 further includes a power source 26 such as a self-contained battery that provides electrical power to a processor 128 that controls functions within the computing device 121. Within the processor 128 are functions, such as encoding and decoding, and additional signal processing functions known in the art.

Computer programs such as drivers for the display 122, algorithms to encode and decode, and the like are stored in a memory 134 which may be an electronic, optical, or magnetic memory storage media as is known in the art for storing computer readable instructions and programs and data. In an exemplary embodiment of the invention, the memory 134 stores a computer program for implementing the invention.

In general, the various embodiments of the computing device 121 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as mobile devices, portable units, or terminals that incorporate combinations of such functions.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings. However, any and all modifications of the teachings of this invention will still fall within the scope of the non-limiting embodiments of this invention.

Furthermore, some of the features of the various non-limiting embodiments of this invention may be used to advantage without the corresponding use of other features. As such, the foregoing description should be considered as merely illustrative of the principles, teachings and exemplary embodiments of this invention, and not in limitation thereof.

There has therefore been disclosed a method for utilizing spare pictures to improve the quality of received picture sequences which can help the receiver to recover pictures referring to a lost picture, and prevent unnecessary picture freezing, feedback and complex error concealment.

Thus, it should be appreciated that the foregoing description has provided by way of exemplary and non-limiting examples a full and informative description of the exemplary embodiments of this invention. However, various modifications and adaptations may become apparent to those skilled in the relevant arts in view of the foregoing description, when read in conjunction with the accompanying drawings and the appended claims. However, all such modifications of the teachings of this invention will still fall within the scope of this invention. Further, while the method and apparatus described herein are provided with a certain degree of specificity, the exemplary embodiments of this invention could be implemented with either greater or lesser specificity, depending on the needs of the user. Further, some of the features of the exemplary embodiments of the invention could be used to advantage without the corresponding use of other features. As such, the foregoing description should be considered as merely illustrative of the principles of the exemplary embodiments of this invention, and not in limitation thereof, as exemplary embodiments of the invention is defined by the claims which follow.

What is claimed is:

1. A method comprising:
configuring at least one processor to perform the steps of:
controlling a receiver to receive a data signal comprising a plurality of encoded frames, wherein the data signal appears in a first access unit;
controlling the receiver to receive a data message indicative of a similarity between a portion of a first one of said plurality of encoded frames and a portion of a non-successive second one of said plurality of encoded frames, wherein said data message appears in a second access unit; and
decoding said portion of said second one of said plurality of encoded frames from said portion of said first one of said plurality of encoded frames when said data signal is corrupted.

2. The method of claim 1 wherein said second one of said plurality of encoded frames and said first one of said plurality of encoded frames each comprise a different syntax.

3. The method of claim 1 wherein said data signal and said data message comprise packet data.

4. The method of claim 1 wherein said data message comprises a Supplemental Enhancement Information (SEI) message.

5. The method of claim 1 wherein said data message comprises at least one spare macroblock map.

6. A program of machine-readable instructions, tangibly embodied on an information bearing medium, execution of which by a digital data processor results in actions comprising:
- receiving a data signal comprising a plurality of encoded frames, wherein the data signal appears in a first access unit;
- receiving a data message indicative of a similarity between a portion of a first one of said plurality of encoded frames, wherein said first one of said plurality of frames appears in a first access unit, and a portion of a non-successive second one of said plurality of encoded frames, wherein said data message appears in a second access unit; and
- decoding said portion of said second one of said plurality of encoded frames from said portion of said first one of said plurality of encoded frames when said data signal is corrupted.

7. The program of claim 6 wherein said second one of said plurality of encoded frames and said first one of said plurality of encoded frames each comprise a different syntax.

8. The program of claim 6 wherein said data signal and said data message comprise packet data.

9. The program of claim 6 wherein said data message comprises a Supplemental Enhancement Information (SEI) message.

10. The program of claim 6 wherein said data message comprises at least one spare macroblock map.

11. A method comprising:
- configuring at least one processor to perform functions comprising at least:
- encoding a plurality of frames to form a data signal;
- computing a data message indicative of a similarity between a portion of a first one of said plurality of frames and a portion of a non-successive second one of said plurality of frames; and
- separately transmitting said data signal and said data message such that the data message is transmitted in one or more frames non-successive to the data signal.

12. The method of claim 11 wherein said data signal and said data message comprise packet data.

13. The method of claim 11 wherein said data message comprises a Supplemental Enhancement Information (SEI) message.

14. The method of claim 11 wherein said data message comprises a plurality of spare macroblock maps.

15. A program of machine-readable instructions, tangibly embodied on an information bearing medium and executable by a digital data processor, the actions comprising:
- encoding a plurality of frames to form a data signal;
- computing a data message indicative of a similarity between a portion of a first one of said plurality of frames and a portion of a non-successive second one of said plurality of frames; and
- separately transmitting said data signal and said data message such that the data message is transmitted in one or more frames non-successive to the data signal.

16. The program of claim 15 wherein said data signal and said data message comprise packet data.

17. The program of claim 15 wherein said data message comprises a Supplemental Enhancement Information (SEI) message.

18. The program of claim 15 wherein said data message comprises at least one spare macroblock map.

19. A mobile device comprising:
- a receiver configured to receive a data signal comprising a plurality of encoded frames in a first access unit, means for receiving a data message indicative of a similarity between a portion of a first one of said plurality of encoded frames and a portion of a non-successive second one of said plurality of encoded frames, wherein said data message appears in a second access unit; and
- a processor configured to decode said portion of said second one of said plurality of encoded frames from said portion of said first one of said plurality of encoded frames when said data signal is corrupted.

20. The mobile device of claim 19, wherein said receiver comprises a wireless receiver.

21. A mobile device comprising:
- a wireless transmitter;
- a wireless receiver;
- a processor coupled to one or more of the wireless transmitter and the wireless receiver; and
- a memory coupled to the processor for storing a set of instructions, executable by the processor, for receiving a data signal comprising a plurality of encoded frames, receiving a data message indicative of a similarity between a portion of a first one of said plurality of encoded frames and a portion of a non-successive second one of said plurality of encoded frames, wherein said data message appears in a second access unit, and decoding said portion of said second one of said plurality of encoded frames from said portion of said first one of said plurality of encoded frames when a frame preceding said second one of said plurality of encoded frames is corrupted.

22. The mobile device of claim 21 wherein said data signal and said data message comprise packet data.

* * * * *